Patented Jan. 9, 1934

1,943,030

UNITED STATES PATENT OFFICE 1,943,030

PROPAGATION OF TREES FROM CUTTINGS

Ralph H. McKee, New York, N. Y.

No Drawing. Application August 2, 1932
Serial No. 627,304

10 Claims. (Cl. 47—58)

This invention relates to an improvement in methods of propagating trees from cuttings.

The principal object of this invention is to increase the number of living trees obtainable from a given number of tree cuttings.

An important object of the invention is to prolong the periods when tree cuttings may be taken and set out successfully.

A further object of the invention is to promote the growth of tree cuttings taken or set out under conditions which normally do not permit growth to occur.

Other objects and advantages of the invention will become apparent during the course of the following description.

As is well known, one of the customary ways of propagating trees is by taking a "cutting", sometimes called a "scion" or "slip", from a living tree and inserting the lower portion of such cutting in the ground. Ordinarily, cuttings are made from wood which has grown one summer and then hardened in the fall. Wood that is more than two years old usually does not grow when planted as a cutting. The highest percentage of growth is obtained by planting in the spring the cuttings from wood of the preceding summer's growth. In securing the cuttings it is customary to wait until after the leaves have fallen from a tree and then branches of about one-fourth inch or larger diameter are cut out into lengths of about fourteen inches. This is usually carried out in the fall, say November or December, and the cuttings stored in a cool, damp place, as in an icehouse or in the ground below the frost line, until spring. During this period "callouses" are formed. These callouses are in the nature of wart-like growth over the ends of the cutting. When the ground has warmed up in the spring, say in March or April, depending upon the locality, the cuttings are planted with about six inches of the cuttings above ground. It is ordinarily understood by those experienced in arboriculture that mature, hardened cuttings (taken after frost and after leaves have fallen) with callouses, are necessary to get a high percentage of the cuttings to grow.

While cuttings are usually calloused before planting, in certain cases, as with more vigorous trees such as willows, a certain measure of success can be obtained by the use of uncalloused cuttings if they are hardened, of full size, and planted under favorable conditions. However, I am not aware of any case in which green cuttings or small cuttings (about one-eighth inch diameter and four to six inches long) have been successfully grown, whether calloused or uncalloused, under out-of-door conditions.

As stated above, it is the general practice in propagating trees from cuttings to use only wood of one summer's growth. Wood which is in the active growing stage is known as "green" wood from the color of the bark of most of such wood, which is sometimes also known as "soft" wood. It is well known that growth from cuttings made from green wood, that is, green wood cuttings, is exceedingly difficult, and in many cases impossible, to obtain even under the best conditions. Accordingly, no attempt is made in the commercial propagation of trees from cuttings to make use of green wood cuttings.

As a matter of fact, even when hardened wood cuttings are used and the cuttings set out under favorable conditions, the percentage of growth of the cuttings leaves much to be desired. As an illustration of the difficulties of propagation by cuttings under the methods commonly known in arboriculture, in the spring some years ago one of the paper companies in this country planted near the shore of Lake Champlain about 500,000 calloused cuttings of the ordinary poplar wood used for paper making (Populus tremuloides) in a nursery. Although the work was done under the direction of an experienced forester, only about one per cent. of the cuttings rooted. In other words, over 99 per cent. of the cuttings died before growth started.

In connection with my study of the practical side of tree propagation, and particularly in my experimental work in the propagation of the hybrid poplars described in my copending application Serial No. 477,979, filed August 26, 1930, I concluded that in order to put the commercial propagation of trees on a practical and economic basis it would be necessary to develop some means for securing a greater yield of living trees from a given source of cuttings. As a result of extensive experimental work directed to this problem I have developed an improvement in the method of propagating trees from cuttings which overcomes the disadvantages mentioned above and also results in certain new advantages.

I have found that if cuttings are treated to provide a waterproof coating on the upper portion thereof, say approximately the upper half, and the cuttings are otherwise handled in accordance with the usual methods referred to above, a materially higher percentage of the cuttings will grow and produce living trees than if the cuttings were not so treated. Certain of my experimental work has been with some seven varieties of trees which would ordinarily grow from large mature cuttings planted in the spring to the extent of about 70 per cent. of the cuttings planted. By treating the cuttings in accordance with the present invention I found that cuttings of but half the usual length and very much smaller diameter could be used. This means that whereas by the former methods the growth of one summer from one cutting would under the best circumstances give six to eight cuttings, say seven on an average, useful for the next year, under the present method similar growth will yield thirty cuttings and a materially higher percentage of living trees.

In my experimental work I have taken as controls small cuttings, even as small as one-eighth inch in diameter and four inches long. When these were planted without being previously treated in accordance with the present invention, the cuttings being planted under favorable conditions with about three inches under ground and one inch above ground, practically all died whether they were hardened cuttings taken in the fall or green wood cuttings taken in June or other summer months. On the other hand, when the same size and quality of cuttings were used, and approximately the upper half coated by dipping into molten paraffin, and then planted in the soil, the major proportion of even those small cuttings grew and formed trees. With larger cuttings, say of one-fourth inch diameter and preferably six inches long, growth occurred in between 80 and 90 per cent. of the cuttings used. Moreover, when treated in accordance with the present invention there seems to be no advantage of hardened wood over growing green wood. Of course, when cuttings are taken from growing green wood the leaves are preferably cut off and only the stem planted.

A second advantage, and a most important one from a commercial standpoint, is that whereas by the former methods of propagation it is necessary to do the planting in a few weeks in the spring just after the frost is out of the ground or, less advantageously, in a few weeks just before the ground freezes in the fall, say two or three weeks at each period, it is possible by my new method to do the planting at the planter's convenience during the entire growing season, that is, to take off branches from growing trees, make cuttings of the desired length, waterproof a portion of each cutting and plant them all on the same half day and at any convenient time. This is exceedingly important from the commercial side as it lengthens the planting season and does away with the rush when one is planting any large acreage. To plant a thousand acres, which is not a large forestry plantation, requires about one and one-fourth million trees on the basis of the trees being set about six feet apart, the customary distance. It is almost impossible to gather a sufficient number of men locally to plant these cuttings in the two or three weeks in which it should be done in the spring. By my new method, a small crew can be used continuously from March to November, that is, as long as the ground is not frozen, for this purpose.

Another advantage of my present process which permits the use of green cuttings is that the trees can be pruned at a convenient time, as during the summer, and the prunings planted at once so that new areas can be reforested and at the same time the areas already planted improved by pruning. Thus, the prunings are saved and used, whereas by the old method, they are discarded.

As stated above, I prefer to treat the cuttings, whether from green or hardened wood, by coating approximately the upper half of the cuttings with a waterproofing material. This is generally done when the cuttings are taken, particularly in the case of green wood cuttings. While I prefer to provide the waterproof coating on the cuttings by dipping them in molten paraffin, other materials may be substituted for the paraffin and other methods of applying the waterproof coatings may be employed. For example, beeswax, cellulose nitrate lacquers, cellulose acetate lacquers and the like may be used. However, paraffin is preferred, principally because it is the cheapest. Moreover, the waterproofing material may be applied as a solution in a suitable solvent. For example, instead of molten paraffin, paraffin dissolved in a solvent such as toluene may be used. Numerous other materials will occur to those skilled in the art. As a matter of fact, any material is suitable which will give a waterproof coating and at the same time will permit the expanding buds later to break through the coating.

I have found that this improvement in tree propagation is particularly adapted to the propagation of members of the poplar family, notably hybrid poplars, from cuttings. Especially have I found that the following numbered hybrid varieties obtained by crossing the species of the genus populus set forth below and which are described in my copending application Serial No. 477,979, filed August 26, 1930, may advantageously be propagated by my new method described above:

| Variety | |
|---|---|
| 1. alba | adenopoda |
| 2. alba | tremula Davidiana |
| 3. alba | balsamifera virginiana |
| 4. angulata | caudina |
| 5. angulata | eugenei |
| 6. angulata | plantierensis |
| 7. angulata | robusta |
| 8. angulata | trichocarpa |
| 9. balsamifera virginiana | beroliniensis |
| 10. balsamifera virginiana | caudina |
| 11. balsamifera virginiana | eugenei |
| 12. balsamifera virginiana | incrassata |
| 13. balsamifera virginiana | plantierensis |
| 14. balsamifera virginiana | robusta |
| 15. balsamifera virginiana (male) | trichocarpa (female) |
| 16. nigra | adenopoda |
| 17. nigra | beroliniensis rossica |
| 18. nigra | eugenei |
| 19. nigra | nigra italica |
| 20. nigra charkowiensis | balsamifera virginiana |
| 21. nigra charkowiensis | caudina |
| 22. nigra charkowiensis | incrassata |
| 23. nigra charkowiensis | plantierensis |
| 24. Sargentii | beroliniensis rossica |
| 25. Sargentii | Simonii |
| 26. nigra | laurifolia |
| 27. nigra baatanicorum vitrum | trichocarpa |
| 28. nigra betulafolia | balsamifera virginiana |
| 29. nigra charkowiensis | eugenei |
| 30. angulata | grandiolenta |
| 31. angulata | incrassata |
| 32. Fremontii | balsamifera virginiana |
| 33. nigra charkowiensis | robusta |
| 34. argentii | nigra italica |
| 35. Simonii | beroliniensis |
| 36. Simonii | robusta |

All of the members of this general class of hybrid poplars which I have developed may advantageously be propagated in the manner described. However, I particularly recommend for propagation by my new method those varieties whose parents are *P. angulata* and *P. trichocarpa*; *P. balsamifera virginiana* and *P. trichocarpa*; and *P. nigra charkowiensis* and *P. balsamifera virginiana*.

By the term "cutting" as employed in the claims is meant a length of wood taken from a living tree to be planted directly in soil. The term is not intended to include a cutting or scion used in grafting, i. e. where the cutting or scion is inserted into another piece of wood or vine and the two grow together and become one.

While I have described in detail the preferred embodiment of my invention it is to be understood that the details of procedure may be variously modified without departing from the spirit of the invention or the scope of the subjoined claims.

I claim:

1. The method of propagating trees from cuttings which are taken or set out under conditions which normally tend to prevent growth which comprises providing a waterproof coating on the upper portion of said cuttings, and planting the thus treated cuttings.

2. The method of propagating trees from cuttings which are taken or set out under conditions which normally tend to prevent growth which comprises providing a coating of paraffin on approximately the upper half of said cuttings when said cuttings are taken, and planting the thus treated cuttings.

3. The method of propagating trees from cuttings taken from green wood which comprises coating approximately the upper half of said cuttings with waterproofing material when said cuttings are taken, and planting the thus treated cuttings.

4. The method of propagating trees from cuttings taken from green wood which comprises removing the leaves from said cuttings and coating approximately the upper half of said cuttings with paraffin when said cuttings are taken, and planting the thus treated cuttings.

5. In the propagation of trees by planting cuttings taken from the trees to be propagated, the method of increasing the number of living trees obtainable from a given source of cuttings by prolonging the times within which cuttings can safely be set out and by permitting the use of relatively short cuttings and cuttings of relatively small diameter which comprises applying a waterproofing material to the upper portion of said cuttings prior to planting the same.

6. In the propagation of trees by planting cuttings taken from the trees to be propagated, the method of increasing the number of living trees obtainable from a given source of cuttings by prolonging the times within which cuttings can safely be set out and by permitting the use of relatively short cuttings and cuttings of relatively small diameter which comprises coating approximately the upper half of said cuttings with a waterproofing material when said cuttings are taken.

7. In a method of propagating trees, wherein cuttings are taken from the trees to be propagated and such cuttings are planted in soil, the improvement which comprises applying a waterproofing material to the upper portion of said cuttings prior to planting the same.

8. In a method of propagating trees, wherein cuttings are taken from the trees to be propagated and such cuttings are planted in soil, the improvement which comprises coating approximately the upper half of said cuttings with a waterproofing material when said cuttings are taken.

9. In a method of propagating trees of the poplar family wherein cuttings are taken from the poplars to be propagated and such cuttings are planted in soil, the improvement which comprises coating approximately the upper half of said cuttings with a waterproofing material prior to planting the same.

10. In a method of propagating hybrid poplars, wherein cuttings are taken from the hybrid poplars to be propagated and such cuttings are planted in soil, the improvement which comprises providing a coating of waterproofing material on approximately the upper half of said cuttings at approximately the time said cuttings are taken.

RALPH H. McKEE.